J. E. SAMUELSON.
TWO ROW CULTIVATOR.
APPLICATION FILED JULY 29, 1914.

1,265,962.

Patented May 14, 1918.
4 SHEETS—SHEET 2.

Witnesses

Inventor
J. E. Samuelson
By
Attorney

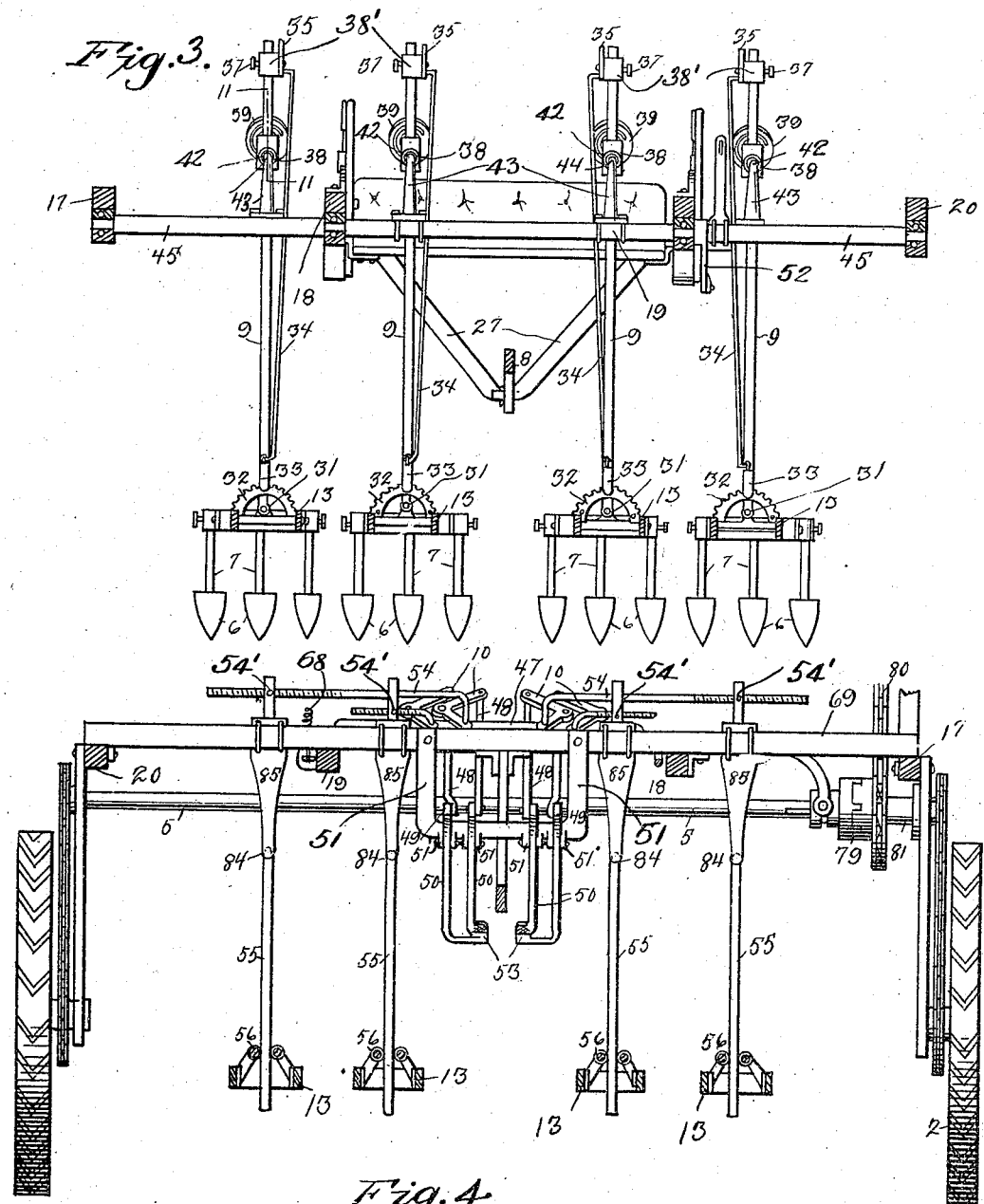

J. E. SAMUELSON.
TWO ROW CULTIVATOR.
APPLICATION FILED JULY 29, 1914
1,265,962.
Patented May 14, 1918.
4 SHEETS—SHEET 4.
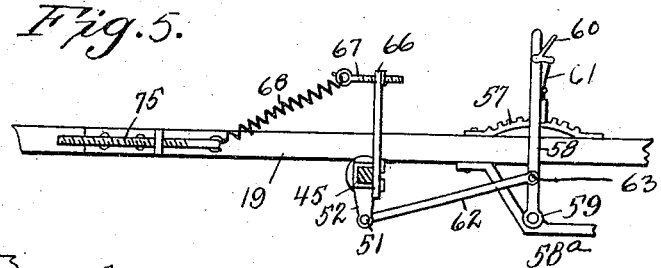
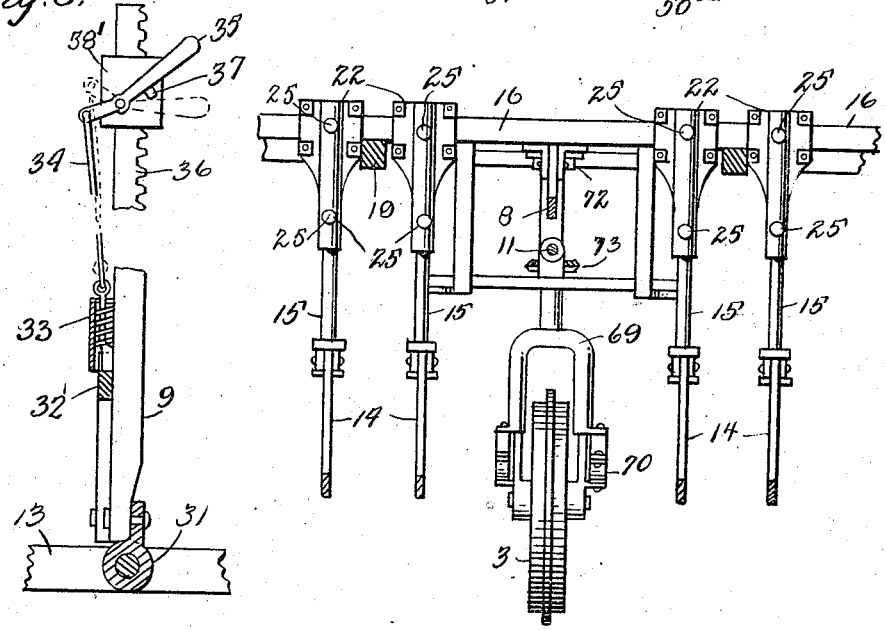
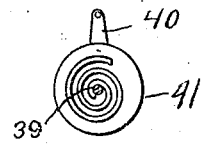
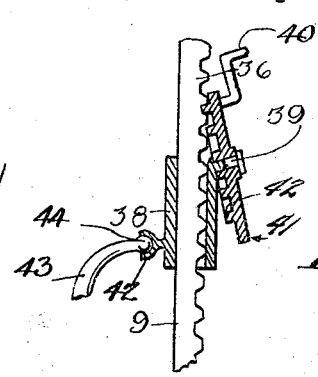
Inventor
J. E. Samuelson

UNITED STATES PATENT OFFICE.

JOHN E. SAMUELSON, OF OPHIEM, ILLINOIS.

TWO-ROW CULTIVATOR.

1,265,962.

Specification of Letters Patent. Patented May 14, 1918.

Application filed July 29, 1914. Serial No. 853,846.

*To all whom it may concern:*

Be it known that I, JOHN E. SAMUELSON, a citizen of the United States, residing at Ophiem, in the county of Henry, State of Illinois, have invented certain new and useful Improvements in Two-Row Cultivators; and I do hereby declare the following to be a full, clear, and exact description of the invention, such as will enable others skilled in the art to which it appertains to make and use the same.

This invention relates to agricultural machinery, and has particular reference to improvements in two-row cultivators.

The primary object of the invention is to construct a two-row cultivator of the motor-driven type in which the cultivating elements possess a wide range of adjustability. In this connection, it is the purpose to construct a machine in which the various shovel gangs are capable of both independent and simultaneous vertical adjustment and also relative and simultaneous lateral adjustment, there being additionally embodied means for holding the gangs at their several positions of adjustment.

With the above objects in view and such other objects as may hereinafter appear, my invention will now be fully set forth and described, reference being had to the accompanying drawings.

In the drawings:—

Fig. 3 is a sectional view on line 4—4 of Fig. 2,

Fig. 4 is a section on the line 4—4 looking in the opposite direction,

Figure 1:
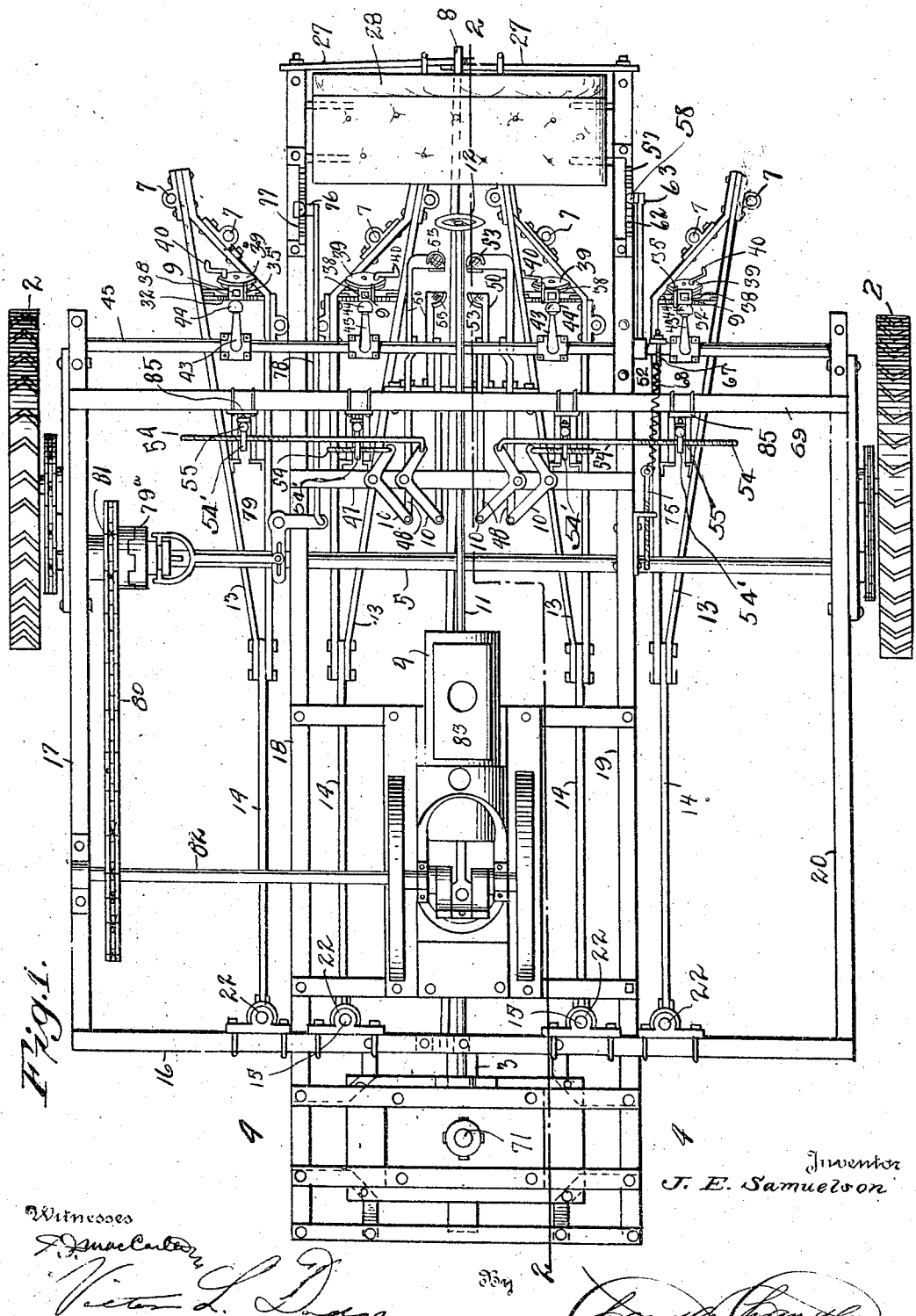
Figure 1 is a plan view of the machine.
Figure 2:
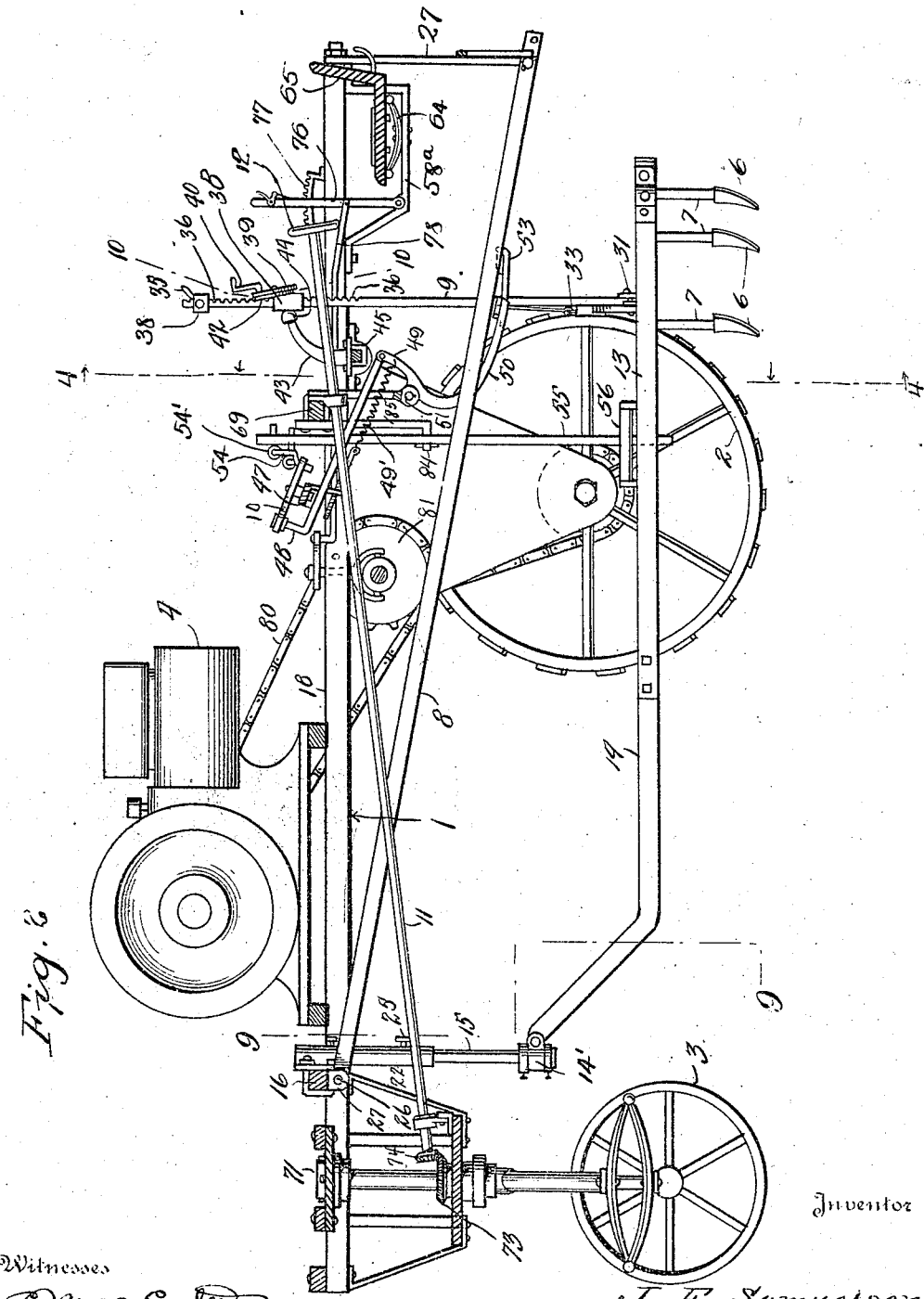
Fig. 2 is a longitudinal section taken on line 2—2 of Fig. 1.

Fig. 5 is a fragmentary side elevation of a portion of the shovel adjusting mechanism, Fig. 6 is a further detail of the same mechanism, Fig. 7 is a section on line 9—9 of Fig. 2, Fig. 8 is a section on line 10—10 of Fig. 2, and Fig. 9 is a section on line 11—11 of Fig. 3.

Referring more particularly to the drawings. 1 indicates the cultivator frame which is supported upon the wheels 2, and the forward guide wheel 3. The machine is driven by means of the motor 4, through a main drive shaft 5. Gangs of plow shovels 6 carried by the standards 7 are assembled upon the frames 13, and vertical standards 9 pivotally supporting the rear ends of the frames 13 provide for the adjustment of the gangs, as will hereinafter appear. A steering rod 11 extends the length of the machine with the forward end geared to the guide wheel 3 and has a steering wheel 12 at its rear end adjacent the driver's seat. A draw bar 8 suitably incorporated in the frame 1 has its rear end suitably located to be connected to a wagon, plow or other implement or vehicle, in order to utilize the power of the engine 4 in transportation.

The frames 13 consist of rearwardly divergent arms whose forward ends are continued in the swinging bars 14 whose forward ends are upturned to connect, by means of joints 14' to the vertical shafts 15 which are vertically adjustable in the sleeves 22 mounted upon the transverse frame member or beam 16, adjusting screws 25 securing the shafts 15 in the sleeves 22. The rear ends of the arms formed in the frames 13 are brought together abruptly to provide the supports for the standards 7 so that they may be located in suitably spaced relation.

The vertical rods 9 are pivoted upon the frames 13 by means of the brackets 31, the latter being mounted in between the arms 13 having the rods 9 pivoted thereto to swing transversely of the machine. Racks 32 mounted across the frames 13 in proximity to the rods 9 are adapted to be engaged by the locking pawls 33 mounted upon the standards 9 and controlled by the rods 34 whose opposite ends connect to the hand levers 35. The hand levers 35 are carried by the boxes or housings 38' which are adjustably mounted upon the upper ends of the rods 9 and are adjustable thereon by means of the bolts 37, the latter engaging the teeth 36 of the bars 9 which provide racks along the edges of the latter. Also slidably mounted upon the bars 9 within the range of the rack teeth 36 are the housings 38. Opposite the teeth 36 the housings 38 carry the stud shaft 39 which extend therein in diagonal relation and support the spiral gears 41 which mesh with the rack 36. Crank arms 40 mounted upon the outer faces of the gears 41 provide means for rotating the latter so as to adjust the bars 9 vertically with relation to the casings or housings 38, thereby raising or lowering the shovel frames 13 independently of one another. The housings 38 are held in rigid relation to the bars 9 by means of the upwardly and rearwardly extending brackets 43 which are secured by means of U-bolts to the transverse shaft 45 which is mounted upon the frame 1. The shaft 45 is rotatable to raise or lower the brackets 43 together, a link 62, Fig. 5, pivoted at 51 to a crank arm 52 on the shaft 45 having its opposite end pivoted at 63 to a hand lever 58 for this purpose. The hand lever 58 is vertically pivoted upon a frame 58ª which is suspended below the longitudinal beam 19 at one side of the driver's position. Upon actuation of the hand lever 58, the shaft 45 is rocked to elevate or lower the several brackets 43 a rack 57 coöperating with the pawl 61 and hand grip 60 providing a means for locking the rods 9 in the position of vertical adjustment.

Also mounted upon the rock shaft 45 is a standard 66 which rises vertically above the shaft, and at its upper end is provided with a longitudinal adjusting screw 67, to whose free end is secured one end of a tension spring 68 whose opposite end is connected to a second adjusting screw or bolt 75 operative in a bracket mounted upon the inner face of the longitudinal beam 19. The spring 68 tends to rock the shaft 45 forwardly so as to normally withdraw the shovel 6 from engagement with the soil and thereby assists the operator in rapidly elevating the shovel when the lever 58 is actuated for that purpose.

The transverse beam 47 of the frame 1 is provided with a plurality of bell crank levers 10 mounted in horizontal relation thereon. One arm of each of the bell crank levers 10 is connected pivotally to a rod 48 whose opposite end is connected as at 49 to the foot levers 50 which are fulcrumed at 51′ to a frame 51 which is suspended from a transverse beam 69 of the framework. The lower ends of the foot levers 50 are provided with pedals 53 at their lower rear extremities so that any one of the several pedals may be readily actuated by pressure from the driver's foot. The pedals 53 are furthermore arranged in pairs upon opposite sides of the center of the machine so that the pairs may be operated by a single pressure. The opposite arms of the bell crank levers 10 are pivotally connected to the rods 54 which are extended across the machine and whose outer ends are threaded to adjustably engage joints 54′ carried by the upper ends of the swinging levers or arms 55 which are pivoted at 84 to the suspended brackets 85, the latter being secured to the transverse frame member 69. The lower ends of the arms or levers 55 hang freely between pairs of rollers 56 which are mounted in brackets supported upon the shovel frames 13. Lateral oscillation of the rods or levers 55 through the rods 54 and the bell crank levers 10 swings the frames 13 in a like manner upon their forward pivoted ends, the four pedals 53 permitting the selective movement of the frame. Springs 49′ fixed to the frame 1 and the arms 49 normally retract the foot pedals 53.

Mounted in the frame 58ª upon the opposite side of the driver's seat from the hand lever 62 is a second hand lever 76 which may be locked to the segment 77 and is connected by a link 78 to a bell crank lever 79 whose second arm is connected to a clutch 79ª by means of which the power source may be thrown into or out of engagement with the cultivator mechanism.

The guide wheel 3 is mounted in a yoke 70 removably fitted into a female yoke or frame 69. The upper end of the frame 69 is provided with a shaft 71 which is supported within the front end of the machine frame. Upon the shaft 71 is mounted the bevel gear 73 which meshes with a corresponding gear 74 carried by the front end of the steering rod 11, the rear end of the latter, as hereinbefore mentioned carrying the steering wheel 12 adjacent the driver's seat. The driver's seat, which is designated by the numeral 65, may be supported upon springs 64 mounted in the frame 58ª.

In the operation of the foregoing mechanism, it will be observed that three distinct adjustments are provided for the cultivator gangs. Thus, the gangs may be collectively raised and lowered by means of the hand lever 58. Also, they may be individually adjusted by means of the vertically movable rods 9 relative to the housings 38 by actuation of the hand cranks 40. In addition to the above, the several gangs may be individually adjusted laterally of the machine frame, the individual adjustability of the gangs permitting the pairs upon opposite sides of the medial line to be adjusted to various distances upon opposite sides of the medial line. Furthermore, the gangs of each pair may be adjusted toward and from one another in order to space them relative to the row over which they are operating, this being accomplished by means of the foot pedals 53 and the bell crank levers 10 and the rods 54. This adjustment may be momentary or temporary determined by the length of time that the pedals are depressed, or they may be locked in adjusted position by engagement of the teeth 33 in the racks 32, the teeth or pawls 33 being controlled by the hand levers 35.

From the foregoing, it is evident that I have provided a two-row cultivator which is adapted for use in the cultivation of corn or any other growing crop. It will be noted that the adjustments are such that the cultivator gangs are set to be swung inwardly toward the rows by actuation of the foot pedals 53, but are set to run straight ahead when running uncontrolled, and furthermore, immediately work away from the row when the foot pedals are released, the springs 49' acting to return the gangs to normal position. This is particularly advantageous in cultivating small plants, since the operator can use both hands in driving the machine while the feet are employed in carefully throwing the cultivator shoes inwardly toward the small plants. On the other hand, when cultivating large plants, it is not necessary to thus manually swing the beam to follow the rows and the gangs may be set by means of the levers 35 to hold a given position throughout the cultivating operations. When the plants are large, and wide cultivation is desired, the two outside beams or gangs can be set to stand well out toward the wheels, and the two inside beams can be set close together, or one of the inner gangs or beams can be removed, and the other inside gang set near the center of the machine. When the gangs are locked in this position, three rows can be cultivated successfully, and to particular advantage when the corn is tall and it is desirable not to cultivate too close to the roots.

What I claim as my invention is—

1. In a cultivator, a main frame, a plurality of shovel frames, swinging supports for said frames, shovels on said frames, toothed standards, hingedly attached to the rear ends of the frames, boxes slidable and adjustable on said standards, a revoluble shaft mounted transversely of the main frame, a plurality of brackets mounted on said shaft and united by universal joints to said boxes, and means for rotating the shaft for withdrawing the shovels from contact with the soil.

2. In a cultivator, a main frame, a plurality of shovel frames attached thereto, shovels supported in said frames, standards hingedly attached to the rear of said frames, foot operated means to swing the frames toward a row, means normally tending to throw the frames away from the row, toothed sectors on said frames adjacent the standards, pawls slidable on said standards and engaging said frames, levers attached to the tops of the several standards, rods connecting said levers and said pawls for withdrawing said pawls from said sectors to permit oblique adjustment of said shovel frames.

3. In a cultivator, a main frame, a plurality of shovel frames attached to said main frame, shovels carried by said frame, a plurality of bell crank levers mounted on the main frame, horizontal threaded bars attached to one extremity of the respective bell crank levers, depending arms attached to said bars and to said shovel frames, and pedals connected to the several opposite arms of the bell-crank levers, for communicating lateral movement to the several shovel frames.

In testimony whereof, I affix my signature, in the presence of two witnesses.

JOHN E. SAMUELSON.

Witnesses:
JOHN L. PETERSON,
MARTIN SAMUELSON.